United States Patent
Francis et al.

(10) Patent No.: US 11,615,129 B2
(45) Date of Patent: Mar. 28, 2023

(54) ELECTRONIC MESSAGE TEXT CLASSIFICATION FRAMEWORK SELECTION

(71) Applicant: International Business Machines Corporation, Armonk, NY (US)

(72) Inventors: Vijay Francis, Nashua, NH (US); Dennis J. Chen, Wellesley, MA (US); Jonathan Dunne, Dungarvan (IE); Andrew T. Penrose, Castleknock (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 823 days.

(21) Appl. No.: 15/824,840

(22) Filed: Nov. 28, 2017

(65) Prior Publication Data
US 2019/0163816 A1     May 30, 2019

(51) Int. Cl.
*G06F 16/35*     (2019.01)
*G06F 18/21*     (2023.01)
(Continued)

(52) U.S. Cl.
CPC ............ *G06F 16/35* (2019.01); *G06F 18/217* (2023.01); *G06F 18/2411* (2023.01);
(Continued)

(58) Field of Classification Search
CPC .......... G06N 20/00; G06N 3/08; G06N 5/003; G06N 3/02; G06N 3/0445; G06F 16/35; G06F 16/353; G06F 17/2785; G06F 16/93; G06F 16/285; G06F 16/3326; G06F 16/24578; G06F 16/355; G06F 16/36;
(Continued)

(56) References Cited

U.S. PATENT DOCUMENTS 5,371,807 A    12/1994   Register
7,895,193 B2    2/2011   Cucerzan
(Continued)

OTHER PUBLICATIONS

C. Apte, F. Damerau, & S. M. Weiss, "Automated learning of decision rules for text categorization," ACM Transactions on Information Systems (TOIS), 12(3), pp. 233-251. Retrieved from internet using: https://www.researchgate.net/profile/Sholom_Weiss/publication/2508166_Automated_learning_of_decision_rules_for_text_categorization/links/0f3175398707116f32000000.pdf.
(Continued)

*Primary Examiner* — Yuk Ting Choi
(74) *Attorney, Agent, or Firm* — Steven L. Nichols; Fabian VanCott (57) ABSTRACT

Electronic message text classification framework selection is described. An incoming electronic message is classified using a current text classification framework. A classification of the electronic message by the current text classification framework is scored. A cost of re-training the current text classification is compared against a cost of switching to a different text classification framework. One of multiple text classification frameworks, which includes the current text classification framework and other text classification frameworks, is selected based on the score of the classification by the current text classification framework and a result of the comparison.

9 Claims, 6 Drawing Sheets

(51) Int. Cl.
*G06F 18/2411* (2023.01)
*G06F 18/2415* (2023.01)
*G06F 18/243* (2023.01)
*G06F 18/24* (2023.01)
*G06N 3/08* (2023.01)
*G06N 20/00* (2019.01)

(52) U.S. Cl.
CPC .. *G06F 18/24155* (2023.01); *G06F 18/24323* (2023.01); *G06F 18/24765* (2023.01); *G06N 3/08* (2013.01); *G06N 20/00* (2019.01)

(58) Field of Classification Search
CPC .... G06F 16/367; G06F 17/27; G06F 11/3409; G06F 11/3466; G06K 9/6262
See application file for complete search history.

(56) References Cited

U.S. PATENT DOCUMENTS

| | | | | |
|---|---|---|---|---|
| 9,069,737 | B1* | 6/2015 | Kimotho | G06F 11/1484 |
| | | | | 707/737 |
| 9,171,253 | B1* | 10/2015 | Wright | G06N 5/02 |
| | | | | 707/737 |
| 9,548,958 | B2 | 1/2017 | Chakra | |
| 2003/0225719 | A1 | 12/2003 | Juang | |
| 2006/0069678 | A1 | 3/2006 | Chou | |
| 2007/0094217 | A1* | 4/2007 | Ronnewinkel | G06Q 10/10 |
| | | | | 706/52 |
| 2007/0100812 | A1* | 5/2007 | Simske | G06F 16/93 |
| | | | | 707/737 |
| 2008/0005051 | A1* | 1/2008 | Turner | G06F 40/242 |
| | | | | 706/20 |
| 2008/0312906 | A1* | 12/2008 | Balchandran | G06F 16/35 |
| | | | | 704/9 |
| 2011/0029527 | A1* | 2/2011 | Knight | G06N 7/005 |
| | | | | 707/737 |
| 2014/0379717 | A1 | 12/2014 | Urmanov | |
| 2015/0193523 | A1* | 7/2015 | Cox | G06F 16/9027 |
| | | | | 707/737 |
| 2016/0330156 | A1 | 11/2016 | Dunne | |
| 2017/0061326 | A1 | 3/2017 | Talathi | |
| 2017/0091619 | A1* | 3/2017 | Towal | G06K 9/4628 |
| | | | | 707/737 |
| 2018/0197105 | A1* | 7/2018 | Luo | G06Q 10/10 |
| | | | | 707/737 |

OTHER PUBLICATIONS

S.C. Hoi, R. Jin & M. R. Lyu, "Large-scale text categorization by batch mode active learning," In Proceedings of the 15th international conference on World Wide Web (pp. 633-642). ACM. Retrieved from Internet using: http://www.cs.cuhk.hk/~lyu/paper_pdf/fp598-hoi.pdf.

Gou, Hang, et al.; Self-Switching Classification Framework for Titled Documents; Abstract; 2008; IEEE; http://ieeexplore.ieee.org/document/4597017/.

* cited by examiner

ELECTRONIC MESSAGE TEXT CLASSIFICATION FRAMEWORK SELECTION

BACKGROUND

The present invention relates to electronic message classification, and more specifically, to the selection of a text classification framework that classifies incoming electronic messages. In professional and social environments, users interact with one another using electronic messages. Such electronic messages can come in a variety of formats including text, audio, and video. Group messaging systems provide a platform for such electronic interaction. Examples of such group messaging systems include social networking systems, internal messaging systems, such as within an organization, and other collaborative spaces. The use of these group messaging systems is increasing, and will continue to increase, with the expanding nature of electronic social interactions. That is, inter-user electronic interactions are becoming less and less tied to geographical boundaries and group messaging systems as a whole are becoming an increasingly relevant component of human correspondence such that their use within society will continue to expand.

SUMMARY

According to an embodiment of the present invention, a computer-implemented method for selecting an electronic message text classification framework is described. According to the method, an incoming electronic message is classified using a current text classification framework. A classification of the electronic message by the current text classification framework is scored and a cost of re-training the current text classification framework is compared to a cost of switching to a different text classification framework. One of the multiple text classification frameworks, which includes the current text classification framework and other text classification frameworks, is selected based on 1) the score of the classification and 2) a result of the comparison.

The present specification also describes a system. The system includes a database containing a number of text classification frameworks which classify incoming electronic messages. A classification scorer of the system scores classifications of multiple text classification frameworks. A simulator compares a probability that re-training a current text classification framework improves performance with a probability that switching to a different text classification framework improves performance. A framework controller selects one of the multiple text classifications frameworks based on an output of the classification scorer and an output of the simulator. In this example, the multiple text classification frameworks include the current text classification framework and other text classification frameworks.

The present specification also describes a computer program product for selecting a text classification framework. The computer program product includes a computer readable storage medium having program instructions embodied therewith. The program instructions executable by a processor to cause the processor to classify an incoming electronic message using a current text classification framework and to score a classification of the electronic message using the current text classification framework. The program instructions are also executable by a processor cause the processor to perform a simulation to compare a cost of re-training the current text classification framework to improve performance with a cost of switching to a different text classification framework to improve performance and select one of the multiple text classification frameworks, comprising the current text classification framework and other text classification frameworks, for text classification based on 1) the score of the classification and 2) an output of the simulation. The program instructions are also executable by a processor to, when a different classification framework is selected, 1) prevent execution of the present text classification framework and 2) call the different classification framework to classify subsequent electronic messages. The program instructions are also executable by a processor to, when a current classification framework is selected, 1) prevent execution of the different text classification framework and 2) determine whether to re-train the current text classification framework to improve performance.

DETAILED DESCRIPTION

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As described above, electronic messaging within groups has become a form of day-to-day correspondence for many people. In some examples, relevant and valuable information is passed through these collaborative groups. Text classification can be executed on these incoming messages to infer a meaning of a text message and/or to summarize the content of the text message. The meaning and or summarization can then be used in a number of ways. For example, the meaning and/or summarization can be the basis for some action fulfillment process. As a specific example, a first user may type the message in an instant message conversation to a friend, "I'm looking forward to my trip to France, do you know of any reasonably priced hotels in Paris?". In this example, a text classification framework may summarize the text as a hotel search in the Paris area. Using this text classification, an action fulfillment system could retrieve and return a list of hotels in the Paris area that are reasonably priced and in some examples may provide links to booking services for the hotel. While this is one specific system, text classification is used regularly to classify and/or summarize text of an electronic message thread or other message corpus, which classification is used in any number of ways to provide services to a user.

Because such text classification frameworks are widely used, and are likely to be even more widely used as electronic message correspondence grows in use over time, advancements to the operation thereof will facilitate their more complete technical integration. Specifically, as text classifications become more accurate, they can be more fully embraced in textual analysis.

For example, in the realms of sales or business, it may be desirable that an electronic message is correctly understood and that a reliable text classification can be made. Even outside of business spheres, it is beneficial if text classifications are correct such that a proper summary and/or classification of the text is made for subsequent operations. In other words, a user may be left with a negative experience if a text classification framework outputs confusing and/or spurious results.

Accordingly, the present specification describes a method and system that provide enhanced textual classification. Specifically, a text classification framework is selected from among multiple frameworks based on each frameworks correctness in classifying a message, and based on a cost to re-train a current framework and switching to a different framework. That is, at any point in time a current text classification framework is used to classify text. Regularly, for example with each message, an electronic message is classified using this current text classification framework. A probability that re-training the current text classification framework will improve performance is then compared against a probability that switching to a different text classification framework will improve performance. Based on 1) the score of the classification of the electronic message by the current text classification framework and 2) the comparison that is carried out, one of the multiple text classification frameworks, whether it be the current text classification framework or another text classification framework, is selected.

In summary, such a system and method 1) provide more accurate textual classifications: 2) provide more relevant subsequent operations such as action fulfillment; and 3) are tailored to a particular electronic message or message corpus. However, it is contemplated that the devices disclosed herein may address other matters and deficiencies in a number of technical areas.

As used in the present specification and in the appended claims, the term "text classification framework" refers to a system that is used to classify and/or summarize a text message. Examples of text classification frameworks include, but are not limited to, a Naïve-Bayes text classification framework, a support vector machine text classification framework, a random tree text classification framework, a random forest text classification framework, a logistic regression text classification framework, an artificial neural network text classification framework, a convocational neural network text classification framework, and a recurrent neural network text classification framework.

Further, as used in the present specification and in the appended claims, the term "re-training" refers to an operation wherein a text classification framework is exposed to additional terms to aid in enhancing that text classification framework accuracy.

Still further, as used in the present specification and in the appended claims, the term "domain" refers to a category of the corpus from which an electronic message is drawn.

Even further, as used in the present specification and in the appended claims, the term "a number of" or similar language is meant to be understood broadly as any positive number including 1 to infinity.

Figure 1:
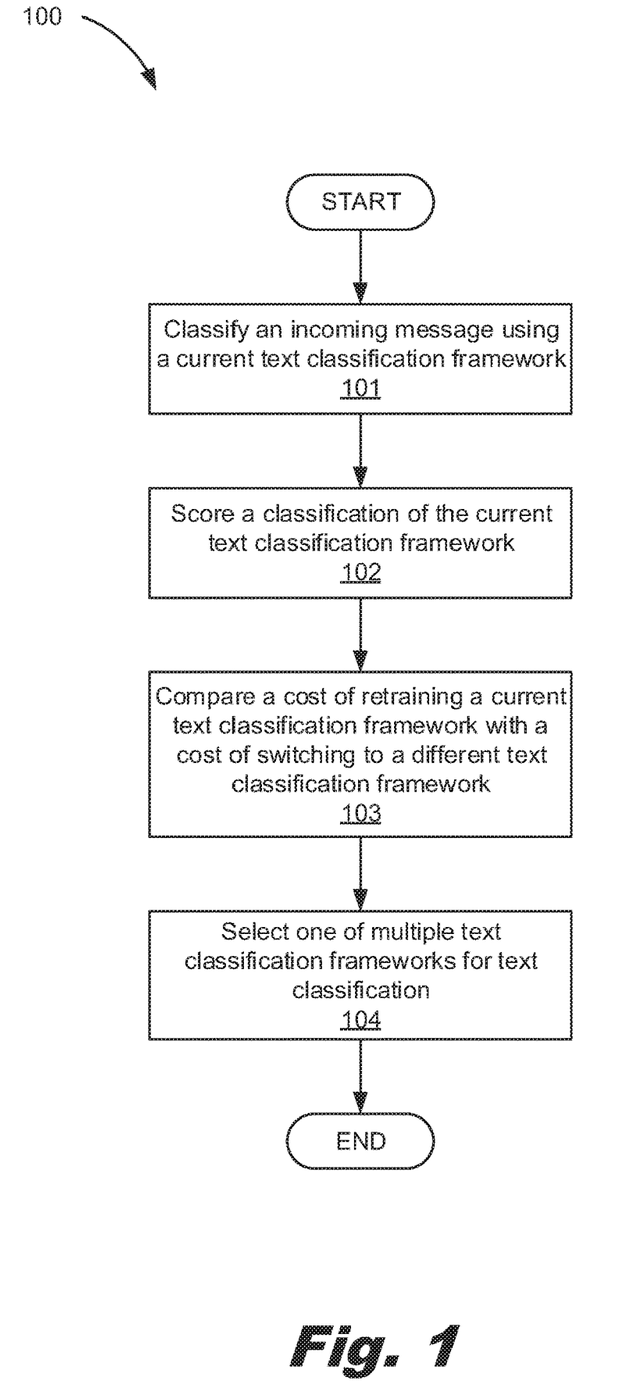
FIG. 1 depicts a flowchart of a method for selecting a text classification framework, according to an example of principles described herein.

Turning now to the figures, FIG. 1 depicts a flowchart of a method (100) for selecting a text classification framework, according to an example of principles described herein. According to the method (100), an incoming electronic message is classified (block 101) using a current text classification framework. As described above text classification frameworks are used to infer a meaning, classify, or otherwise summarize a particular electronic message, or group of electronic messages, in a message corpus. For example, a message from one user to another user, or to group of users may state "How much can I expect to spend to fly from Los Angeles to London." A text classification framework may be used to classify this text as relating to air travel.

There are a number of different text classification frameworks that could be used to classify a particular electronic message. Examples of text classification frameworks include, but are not limited to, a Naïve-Bayes text classification framework, a support vector machine text classification framework, a random tree text classification framework, a random forest text classification framework, a logistic regression text classification framework, an artificial neural network text classification framework, a convocational neural network text classification framework, and a recurrent neural network text classification framework.

Each of the different text classification frameworks operates differently from one another, and accordingly, may result in different classifications of a particular electronic message. The different classifications may be more or less precise and accurate than classifications from other text classification frameworks, depending on a particular context and the content of a particular electronic message.

In some examples, different frameworks, by different manufacturers may also result in different classifications. In some examples, at least one of the text classification frameworks uses emotive analysis. A text classification framework that uses emotive analysis can evaluate word choice, punctuation, and/or user history to determine an emotion conveyed by a particular electronic message. This emotive analysis can increase the score for a particular text classification framework as it provides another criteria by which a framework can infer a meaning.

The classification output by the current text classification framework is then scored (block 102). The classification score may be one, or multiple values, which indicate the performance of the different classification frameworks. The classification score may be based on a number of performance scores. Examples of performance scores that are used to score (block 102) a particular classification include a precision score, a recall score, and an f1 score. In this example, precision refers to a fraction of retrieved documents that are relevant to the query. Accordingly a precision score for a text search on a set of documents is determined by dividing the number of correct results by the number of returned results. A precision score may account for all retrieved documents, or can also be evaluated at a given cut-off rank, considering just the topmost results returned. The precision score can be used with a recall score which compares the percent of all relevant documents that are returned by the search. That is, the recall score indicates the fraction of the relevant documents that are successfully retrieved. For example, for a text search on a set of documents, a recall score is calculated by dividing the number of correct results by the number of results that should have been returned. An f1 score is a measure of the accuracy of a classification. That is, an f1 score includes both the precision score and the recall score of the classification and computes a combined score therefrom. While particular reference is made to specific performance scores, different types of performance scores can be used in any combination to generate the overall classification score.

As described above, individual values for each score, or some combined value of all the scores may be used to score a particular classification. For example, the phrase "welcome everyone, our game starts at 9 am today" could be classified (block 101) by a support vector machine (SVM) text classification framework. In this example, the SVM text classification framework may have a precision score, recall score, and fl score of 0.54, 0.64, and 0.62, respectively. From these scores, it may be determined whether performance can be improved by either 1) retaining the SVM text classification framework without re-training, 2) retaining the SVM text classification framework and re-training the framework, and 3) switching to a different text classification framework.

In this example, switching and re-training both have a cost associated with them. For example, re-training a text classification framework takes time to expose the classification framework to additional data, i.e., words, and switching a text classification framework has a cost of not using the previous learning by the current text classification framework. However, it may be determined that the cost associated with either is offset by an increase in performance. In some examples, the performance of the current text classification framework may be satisfactory such that a switch to a different text classification framework or re-training the current text classification framework is unnecessary.

Accordingly, in addition to scoring (block 102) the classification by the current text classification framework, the method (100) includes comparing (block 103) a cost of re-training the current text classification framework with a cost of switching to a different text classification framework. That is, if increased performance is desired, the current text classification framework may be switched for a different text classification framework, or the current text classification framework may be re-trained to improve its performance. Either scenario costs time and resources to carry out. For example, as described above, switching to a new text classification framework results in lost time due to calling, initializing, and training the new text classification framework. In the case of re-training the current text classification framework, additional terms and phrases are run through the current text classification framework to expand its vocabulary and thereby increasing the probability of a more accurate result. The relative cost of re-training and switching may be different given different text corpora and the probability that each will improve performance may be different per text corpora as well.

In some examples, comparing (block 102) the cost of re-training a current text classification framework with the cost of switching to a different text classification framework includes running a number of simulations. The simulations provide a probabilistic score as to whether a framework should be switched, or retained and re-trained. That is, the simulations 1) determine a probability that re-training the current text classification framework will increase performance and 2) determine a probability that switching the current text classification framework for a new text classification framework will increase performance. This can be determined by simulating a number of text classifications using the current text classification framework and by simulating a number of text classifications using a different text classification framework. In some examples, a Markov chain Monte Carlo simulation could be used. In such a simulation, a probability distribution is sampled by constructing a Markov chain that has a desired distribution as its equilibrium distribution. The state of the chain after a number of cycles is then used as a sample of the desired distribution. According to such a system, observed sample data is collected to indicate an initial prior probability distribution. The probabilities of switching text classification frameworks are then observed to derive a conjugate distribution and the prior probability distribution and the conjugate distribution are combined to form a posterior distribution.

Such a simulation can be indicative of future performance. For example, in the short term switching to a different text classification framework may improve performance, but that different text classification framework may be subsequently switched out for the current text classification framework such that it would have been better had the current text classification framework been re-trained. Such simulations provide such data to indicate, over the long run, whether a switch will result in better performance.

An output of such simulations may be a probabilistic scores that either scenario is likely to result in increased performance. For example, an output may indicate that the probability that increased performance results from re-training the current text classification framework may be 0.9 and the output may indicate that the probability of increased performance results from switching to a new text classification framework may be 0.10.

Accordingly, based on the classification score and the output of the comparison, one of the multiple text classification frameworks is selected (block 104). That is, it is determined whether the probability of increased performance potentially resultant from switching is greater than the cost associated therewith, or if the trade-off is too much. If the trade-of is too much, and the current text classification framework is retained, it can also be determined whether the potential increase in performance outweighs the cost of re-training the current text classification framework. The output from the example above would indicate that re-training the current text classification framework is more likely to result in increased performance and therefore may justify the cost of re-training the current text classification framework, rather than switching to a new text classification framework.

Such a method (100) allows for the arbitration of text classification frameworks based on incoming messages and can even be used real-time in messaging systems, and other collaborative systems. As the different frameworks may perform differently based on particular characteristics of a messaging thread, the present method (100) ensures that the text classification framework with the best performance can be implemented thus providing a message-tailored classification system. Using the text classification framework with the best performance enhances the results of subsequent operations. In other words, the method (100) as described herein increases the ability of a computing system to provide accurate and relevant text classifications, which accurate and relevant text classifications increase the technical ability of a computing system to carry out any number of subsequent operations including action fulfillment. Thus, a computing system that executes the method (100) has increased technical capability to analyze and classify electronic messages.

Figure 2:
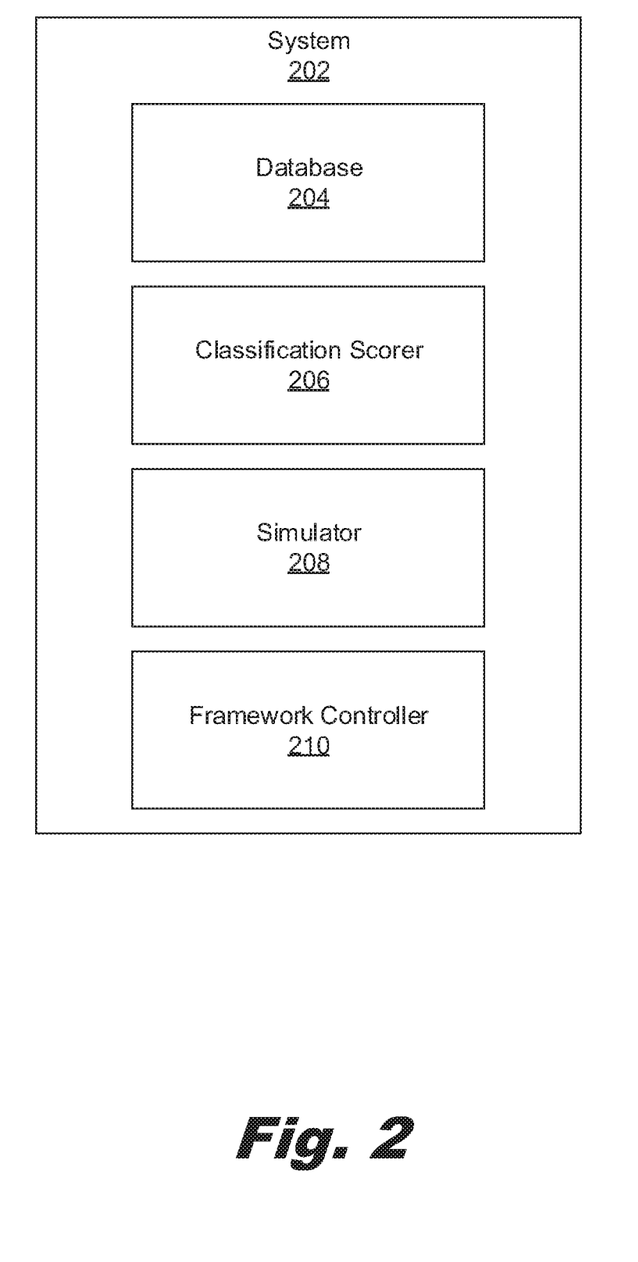
FIG. 2 depicts a system for selecting a text classification framework, according to an example of the principles described herein.

FIG. 2 depicts a system (202) for selecting a text classification framework, according to an example of the principles described herein. To achieve its desired functionality, the system (202) includes various components. Each component may include a combination of hardware and program instructions to perform a designated function. The components may be hardware. For example, the components may be implemented in the form of electronic circuitry (e.g., hardware). Each of the components may include a processor to execute the designated function of the engine. Each of the components may include its own processor, but one processor may be used by all the components. For example, each of the components may include a processor and memory. Alternatively, one processor may execute the designated function of each of the components.

The system (202) includes a database (204). The database (204) stores a number of text classification frameworks that are used to classify incoming electronic messages. As described above, any number of text classification frameworks may be used at different points in time, and those different text classification frameworks may be stored in the database (204) of the system (202). As different text classification frameworks are selected for use, they are called from the database (204).

The system (202) also includes a classification scorer (206). The classification scorer provides a score for the classifications provided by different text classification frameworks. For example, the classification scorer (206) may determine the precision score, the recall score and/or the fl score for classifications. In some examples, the classification scorer (206) combines these performance scores into an aggregate classification score. In other examples, each performance score is a separate value within the classification score. In either form, the classification scorer (206) passes the classification score to the framework controller (210). As such, the classification scores are used by the framework controller (210) to determine which text classification framework to execute, and to subsequently execute the particular text classification framework to classify a particular electronic message.

A simulator (208) of the system (202) then runs a number of simulations to determine the probability that increased performance will result from either switching to a different text classification framework or maintaining, and possibly re-training, the current text classification framework. In other words, a classification score itself may indicate a performance level, but is a single data point and random variation within the text classification frameworks may affect the particular text classification and may skew any classification score resulting therefrom. The simulator (208) by running a number of simulations of text classifications on the electronic message provides more data points. The additional data points reduce the effect, or presence of any such skew resulting in a more accurate indication of a probable performance of a particular text classification framework. In performing simulations, the simulator (208) may run a number of simulations on the electronic message using the current and different text classification frameworks and aggregate the resulting scores to determine what the probability is that an increased performance will result.

As described above, the framework controller (210) of the system (202) then controls the multiple text classification frameworks based on the results of the simulator (208) and classification scorer (206). For example, an output of the classification scorer (206), which is a single data point indication of classification performance for an electronic message, and the output of the simulator (208), which is a multi-point indication of classification performance is passed to the framework controller (210). Based on these outputs, a framework controller (210) may determine a certain probability of increased performance when a current text classification framework is switched for another. However, the probability of increased performance may not be so great as to justify expending the resources and time to perform the switch. Accordingly, the current text classification framework may be retained.

By comparison, the output of the classification scorer (206) and the output of the simulator (208), may indicate a certain probability of increased performance that outweighs the cost associated with switching the text classification framework. In retaining and/or switching, the framework controller (210) prevents execution of certain text classification frameworks and facilitates, or calls, other text classification frameworks. Thus, the system (202) selects and executes various text classification frameworks, switches between text classification frameworks, and may manipulate a text classification framework (i.e., re-train a text classification framework) to provide more accurate results. This is done while considering the cost of re-training/switching with the probability that better performance will be achieved. All this is done within the specific context of a received electronic message such that the determination to re-train or switch is specifically related to the present electronic message. Evaluating various text classification accuracy as it pertains to a particular electronic message increases the system (202) technical capability to provide relevant, and accurate, textual classifications.

Figure 3:
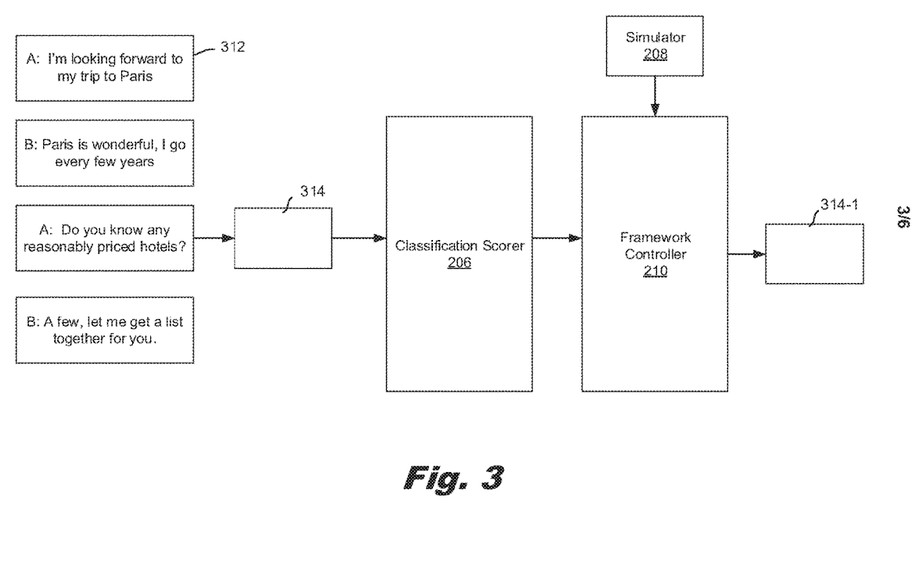
FIG. 3 depicts a flow diagram for selecting a text classification framework, according to an example of the principles described herein.

FIG. 3 depicts a flow diagram for selecting a text classification framework (314), according to an example of the principles described herein. As described above, during an electronic collaborative session such as a group messaging chat between multiple users, electronic messages (312) may be shared. While FIG. 3 depicts textual electronic messages (312), other forms may be implemented as well such as voice, and video electronic messages. For simplicity, one instance of an electronic message (312) is indicated with a reference number. In this example, the domain, or category for the message thread relates to travel, and particularly to travel to Paris.

In this example, each electronic message (312) is received and classified by a current text classification framework (314). The classification from the current text classification framework (314) is passed to a classification scorer (206) where it is scored as described above. For example, a precision score, recall score, and/or fl score among others is determined for each classification.

The framework controller (210) also receives as input the results of a simulator (208), which simulator (208) has run a number of simulations to determine the probability 1) that switching to a different text classification framework (314) would improve performance and 2) that maintaining the current text classification framework (314), either as is or re-trained, would improve performance. Based on these two inputs, the framework controller (210) selects a particular text classification framework (314) to classify that electronic message (312) and potentially other electronic messages. In so doing, the framework controller (210) issues commands to call certain text classification frameworks (314) from the database (FIG. 2, 204).

Figure 4:
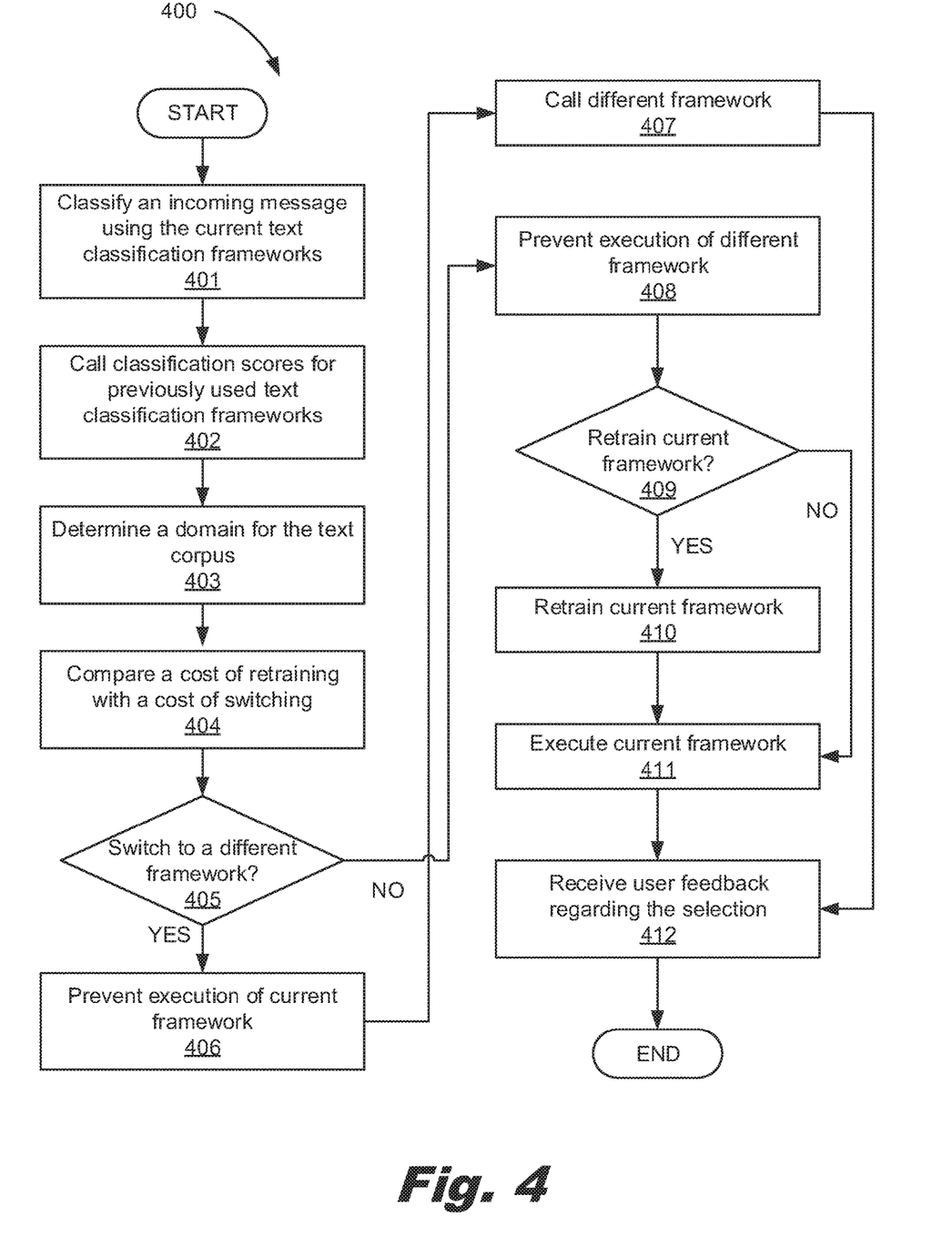
FIG. 4 depicts a flowchart of a method for selecting a text classification framework, according to an example of principles described herein.

FIG. 4 depicts a flowchart of a method (400) for selecting a text classification framework (FIG. 3, 314), according to an example of principles described herein. In this example, an incoming electronic message (FIG. 3, 312) is classified (block 401) using the current text classification frameworks (FIG. 3, 314). This may be performed as described above in connection with FIG. 1.

In some examples, classification scores for previously used text classification frameworks (FIG. 3, 314) are called (block 402). For example, at an earlier point in time a different text classification framework from the current text classification framework (FIG. 3, 314) may have been used, but switched out. In this example, a classification score may exist for the previous text classification framework. This score can be used by the system (FIG. 2, 202) to aide in the determination of whether to switch or re-train.

For example, the current text classification system may be a first SVM text classification framework. Previous to this point in time, a naïve-Bayes classification score for a different electronic message may have a precision score, recall score, and fl score of 0.56, 0.68, and 0.64 respectively. The first SVM text classification framework for the current electronic message, may have a precision score, recall score, and f1 score of 0.54, 0.64, and 0.62, respectively. Still further, a second SVM text classification framework used on another electronic message may have a precision score, recall score, and f1 score of 0.46, 0.48, and 0.44 respectively. From these scores, it suggests that the naïve-Bayes may have the best performance. However, as naïve-Bayes is not what is currently being used to classify electronic messages, there may be an associated cost in switching to the naïve-Bayes framework. Moreover, the first SVM text classification framework may be re-trained. However, there is also a cost with performing the re-training of the SVM text classification framework.

In some examples, a domain, or category, may be determined (block 403) for the text corpus. As used in the present specification, a text corpus refers to the body of electronic messages to which the electronic message (FIG. 3, 312) belongs. The text corpus may be defined temporally, i.e., messages occurring within a predetermined amount of time from one another, organizationally, i.e., between particular individuals, among other grouping characteristics, or topically. The determination about whether to switch, and which text classification framework (FIG. 3, 314) to switch to, may be based in part on the domain. For example, some categories may, by their nature, involve the frequent switching between text classification frameworks (FIG. 3, 314). Still further, some categories, by their nature, may generally be classified better by a particular text classification framework (FIG. 3, 314). Accordingly, the criteria by which it is determined when to switch, or what to switch to, may be dependent upon a particular domain. For example, a threshold for switching may be set lower such that switching between text classification frameworks occurs more frequently.

A cost of re-training a current text classification framework (FIG. 3, 314) is compared (block 404) against a cost to switch to a different text classification framework (FIG. 3, 314). This may be performed as described above in connection with FIG. 1.

It is then determined (block 405) if a switch to a different text classification framework (FIG. 3, 314) should be executed. If a switch to a different text classification framework (FIG. 3, 314) should be carried out (block 405, determination YES), i.e., the increase in performance resulting from the switch outweighs the cost of the switch, then the system (FIG. 2, 202), more specifically the framework controller (FIG. 2, 210), prevents (block 406) the execution of the current text classification framework (FIG. 3, 314) and calls (block 407) the different text classification framework (FIG. 3, 314).

By comparison, if a switch to a different text classification framework (FIG. 3, 314) should not be carried out (block 405, determination NO), i.e., the present text classification framework (FIG. 3, 314) should be retained, the different text classification frameworks (FIG. 3, 314), i.e., other than the current text classification framework (FIG. 3, 314), are prevented (block 408) from executing.

Still in the case of retaining the current text classification framework (FIG. 3, 314), it is determined (block 409) whether the present text classification framework (FIG. 3, 314) should be re-trained or maintained in its current state. For example, the current text classification framework (FIG. 3, 314) may be performing adequately, such that it is not desirable to incur the cost of re-training the current text classification framework (FIG. 3, 314). In another example, the current text classification framework (FIG. 3, 314) may be performing poorly, such that re-training the current text classification framework (FIG. 3, 314) would increase in performance such that it justifies incurring the cost of such re-training.

If re-training is desired (block 409, determination YES), the current text classification framework (FIG. 3, 314) is re-trained (block 410) and executed (block 411), meaning it is run to classify the electronic message (FIG. 3, 312). By comparison, if re-training is not desired (block 409, determination NO), the current text classification framework (FIG. 3, 314) is executed (block 411) without re-training. Accordingly, to the method (400) described herein, the system (FIG. 2, 202) includes three states 1) retain and re-train the current text classification framework (FIG. 3, 314), 2) retain and do not re-train the current text classification framework (FIG. 3, 314), and 3) switch to a different text classification framework (FIG. 3, 314).

In any state, user feedback may be received (block 412) regarding the selection. That is, a user may rank whether the text classification framework (FIG. 3, 314) that is executing is performing as desired. For example, if a switch operation was executed a user may indicate that the classification resulting from the different text classification framework (FIG. 3, 314) is either satisfactory or not. Similarly, if a re-train operation was executed a user may indicate that the classification resulting from the re-trained current text classification framework (FIG. 3, 314) is either satisfactory or not. This feedback can be stored in the database (FIG. 2, 204) and used by the system (FIG. 2, 202) specifically, the simulator (FIG. 2, 208) in future evaluation of probable improved performance. For example, if a user indicates that a second text classification framework (FIG. 3, 314), which was switched to from a first text classification framework (FIG. 3, 314), is inadequate, user feedback may weigh against the selection of that second text classification framework (FIG. 3, 314) in the future.

In some examples, the selection can be used in a re-train/switch decision related to another electronic message, which other electronic message may be in a different text corpus. For example, if a second electronic message is determined to be in a corpus similar to the corpus of the current electronic message, the selection of one of the multiple text classification frameworks (FIG. 3, 314) for the current electronic message can weigh for selection of that particular text classification framework (FIG. 3, 314) for subsequent selections. That is, the results of the selection may be stored and generalized across similar, or in some cases dissimilar, domains.

Figure 5:
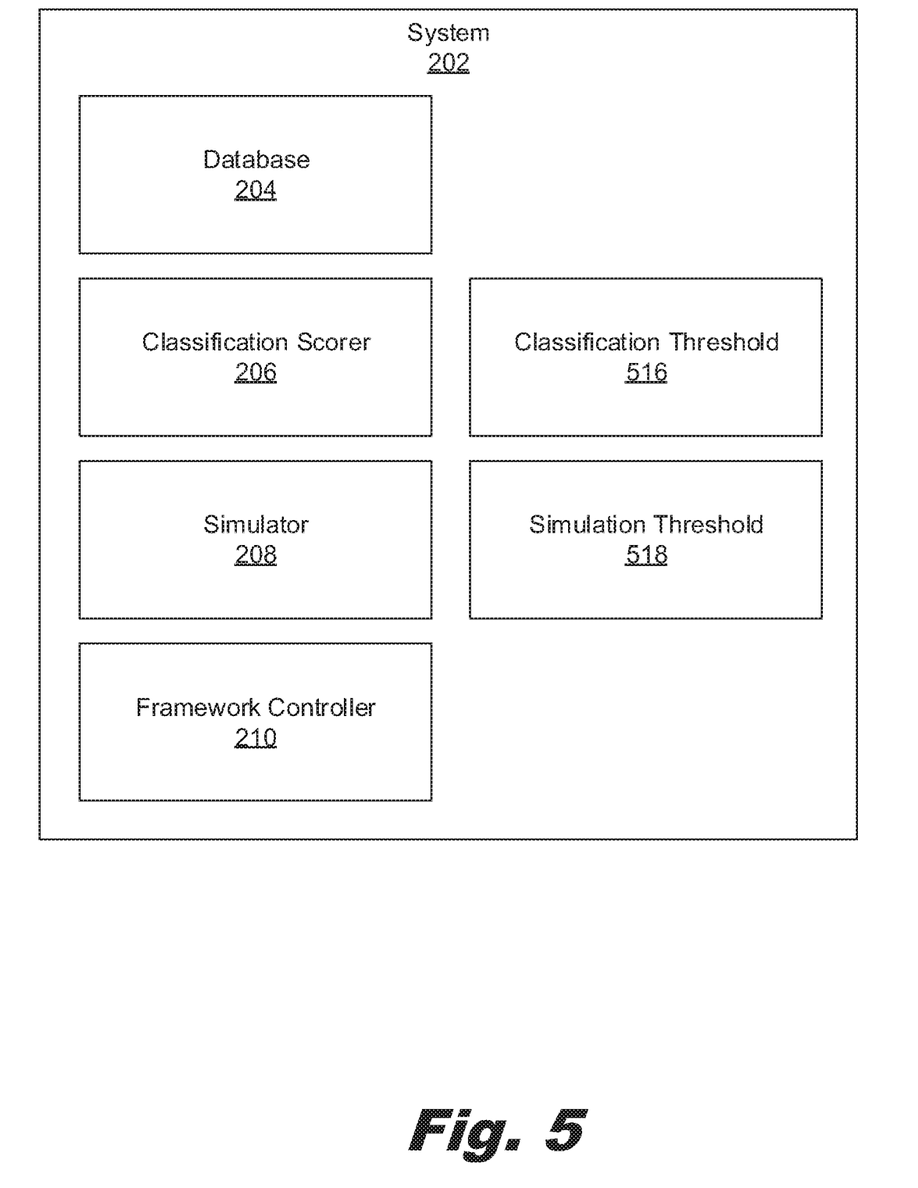
FIG. 5 depicts a system for selecting a text classification framework, according to an example of the principles described herein.

FIG. 5 depicts a system (202) for selecting a text classification framework (FIG. 3, 314), according to an example of the principles described herein. In addition to the components described above in FIG. 2, in some examples the system (202) also includes a classification threshold (516). The classification threshold (516) is a threshold against which the classification scores are compared to determine whether to perform simulations. For example, the classification threshold (516) may indicate a predetermined score. When a classifier score for the current text classification framework (FIG. 3, 314) drops below this classification threshold (516), simulations should be performed to determine whether a switch or re-training should be performed. By comparison, a score for the current text classification framework (FIG. 3, 314) that is greater than the classification threshold (516) indicates a satisfactory level of performance such that no simulation is to be executed.

In this example, the system (202) also includes a simulation threshold (518). The simulation threshold (518) is a value, or values against which the probabilities, i.e., the output of the simulator (208), are compared to determine whether to re-train or whether to switch to a different text classification framework. For example, the simulation threshold (518) may be 0.7 and if either output of the simulator (208) indicates a score less than 0.7 for an operation, i.e., re-training or switching, then that operation may be avoided.

Figure 6:
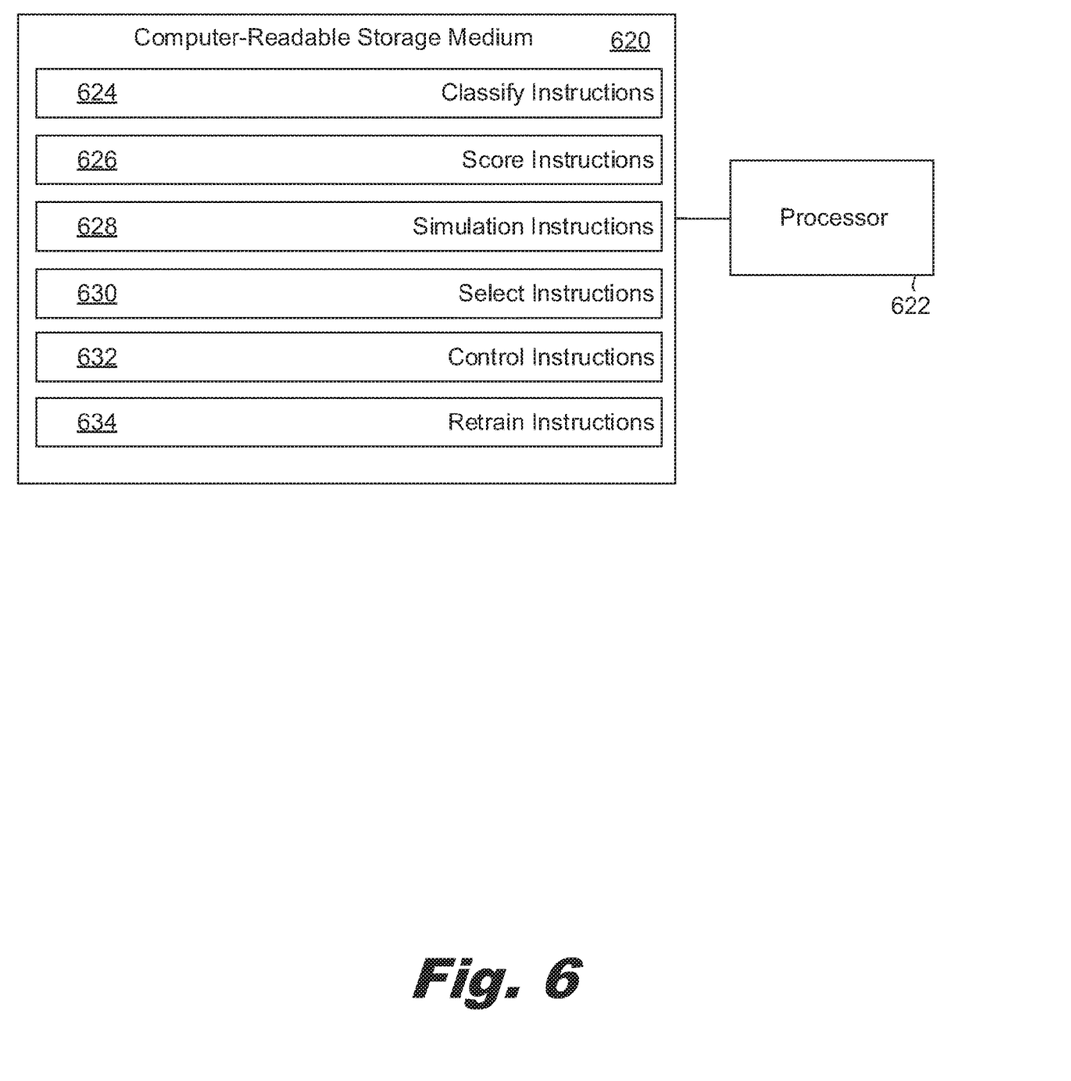
FIG. 6 depicts a computer readable storage medium for selecting a text classification framework, according to an example of principles described herein.

FIG. 6 depicts a computer readable storage medium (620) for selecting a text classification framework (FIG. 3, 314), according to an example of principles described herein. To achieve its desired functionality, a computing system includes various hardware components. Specifically, a computing system includes a processor (622) and a computer-readable storage medium (620). The computer-readable storage medium (620) is communicatively coupled to the processor (622). The computer-readable storage medium (620) includes a number of instructions (624, 626, 628, 630, 632, 634) for performing a designated function. The computer-readable storage medium (620) causes the processor (622) to execute the designated function of the instructions (624, 626, 628, 630, 632, 634).

Referring to FIG. 6, classify instructions (624), when executed by the processor (622), cause the processor (622) to classify an incoming electronic message (FIG. 3, 312) using a current text classification frameworks (FIG. 3, 314). Score instructions (626), when executed by the processor (622), may cause the processor (622) to score the classification of the current text classification framework (FIG. 3, 314). Simulation instructions (628), when executed by the processor (622), may cause the processor (622) to perform a simulation to compare a coast of re-training the current text classification framework (FIG. 3, 314) to improve performance with a cost of switching to a different text classification framework (FIG. 3, 314) to improve performance. Select instructions (630), when executed by the processor (622), may cause the processor (622) to select one of the multiple text classification frameworks (FIG. 3, 314) for text classification based on 1) the score of the classification and 2) an output of the simulation. In this example, the current text classification framework (FIG. 3, 314) is one of the multiple text classification frameworks.

When a different text classification framework (FIG. 3, 314) is selected, control instructions (632), when executed by the processing resources, cause the processor (622) to prevent execution of the current text classification framework (FIG. 3, 314) and call the different text classification framework (FIG. 3, 314) to classify the electronic message (FIG. 3, 312). When the current text classification framework (FIG. 3, 314) is selected, control instructions (632), when executed by the processing resources, cause the processor (622) to prevent execution of the different text classification frameworks (FIG. 3, 314) and if desired, retrain instructions (634), when executed by the processing resources, cause the processor (622) to re-train the current text classification framework (FIG. 3, 314) to improve performance.

In summary, such a system and method 1) provide more accurate textual classifications; 2) provide more relevant subsequent operations such as action fulfillment; and 3) are tailored to a particular electronic message or message corpus. However, it is contemplated that the devices disclosed herein may address other matters and deficiencies in a number of technical areas.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:
    a database containing a number of text classification frameworks which classify incoming electronic messages;
    a classification scorer to score classifications of multiple text classification frameworks by aggregating a precision score, recall score, and an f1 score for each classification;
    a simulator to:
        provide a first probabilistic score indicating a probability of increased performance resulting from re-training a current text classification framework, wherein the first probabilistic score is an aggregation of probabilistic scores of multiple simulations of a re-trained current text classification framework;
        provide a second probabilistic score indicating a probability of increased performance resulting from switching to a different text classification framework wherein the second probabilistic score is an aggregation of probabilistic scores of multiple simulations of the different text classification framework;
        compare the first probabilistic score with the second probabilistic score;
        compare a cost of re-training the current text classification framework to improve performance with a cost of switching to a different text classification framework to improve performance; and
    a framework controller to select one of the multiple text classification frameworks based on:
        an output of the classification scorer;
        an output of the simulator; and
        content of the electronic message;
    wherein the multiple text classification frameworks comprise the current text classification framework and other text classification frameworks.

2. The system of claim 1, wherein at least one of the multiple text classification frameworks employs emotive analysis.

3. The system of claim 1, wherein the database stores the classification scores for use by the simulator.

4. The system of claim 1, wherein the simulator executes a number of simulations of re-training the current text classification framework and a number of simulations of switching to a different text classification framework.

5. The system of claim 1, further comprising a classification threshold against which classification scores are compared to determine whether to perform simulations.

6. The system of claim 1, further comprising a simulation threshold against which the probabilities are compared to determine whether to re-train the current text classification framework or switch to the different text classification framework.

7. The system of claim 1, wherein the classification scorer scores classifications using at least one of a precision score, a recall score, and an f1 score.

8. A computer program product for selecting a text classification framework, the computer program product comprising a computer readable storage medium having program instructions embodied therewith, the program instructions executable by a processor to cause the processor to:

classify an incoming electronic message using a current text classification framework;

determine a precision score for the current text classification framework which indicates a number of correct results divided by a number of returned results;

determine a recall score for the current text classification framework which indicates a fraction of relevant documents that are retrieved; and determine an f1 score for the current text classification framework which indicates a combined precision score and recall score;

provide a classification score for the current text classification framework based on the precision score, recall score, and f1 score;

perform a first set of multiple simulations of a re-trained current text classification framework to determine a probabilistic score for each simulation;

aggregate the probabilistic stores for the first set of multiple simulations to provide a first probabilistic score indicating a probability of future increased performance resulting from re-training a current text classification framework;

perform a second set of multiple simulations of different text classification frameworks to determine a probabilistic score for each simulation;

aggregate the probabilistic stores for the second set of multiple simulations to provide a second probabilistic score indicating a probability of future increased performance resulting from switching to a different text classification framework;

compare the first probabilistic score with the second probabilistic score;

compare a cost of re-training the current text classification framework to improve performance with a cost of switching to a different text classification framework to improve performance;

select one of the multiple text classification frameworks, which comprises the current text classification framework and other text classification frameworks, for text classification based on:

the classification score; and a comparison of the first probabilistic score and the second probabilistic score;

when the different classification framework is selected:

prevent execution of the current text classification framework; and call the different text classification framework to classify the electronic message; and when the current classification framework is selected:

prevent execution of the different text classification framework; and determine whether to re-train the current text classification framework to improve performance.

9. The computer program product of claim 8, wherein the multiple text classification frameworks comprise at least a naïve Bayes text classification framework, a support vector machine text classification framework, a random tree text classification framework, a random forest text classification framework, a logistic regression text classification framework, an artificial neural network text classification framework, a convocational neural network text classification framework, and a recurrent neural network text classification framework.

* * * * *